Oct. 9, 1945.  N. C. ARTSAY  2,386,188
HEAT EXCHANGE APPARATUS
Filed March 4, 1942  4 Sheets-Sheet 1

INVENTOR
NICHOLAS C. ARTSAY
BY
ATTORNEY

Oct. 9, 1945.   N. C. ARTSAY   2,386,188
HEAT EXCHANGE APPARATUS
Filed March 4, 1942   4 Sheets-Sheet 2
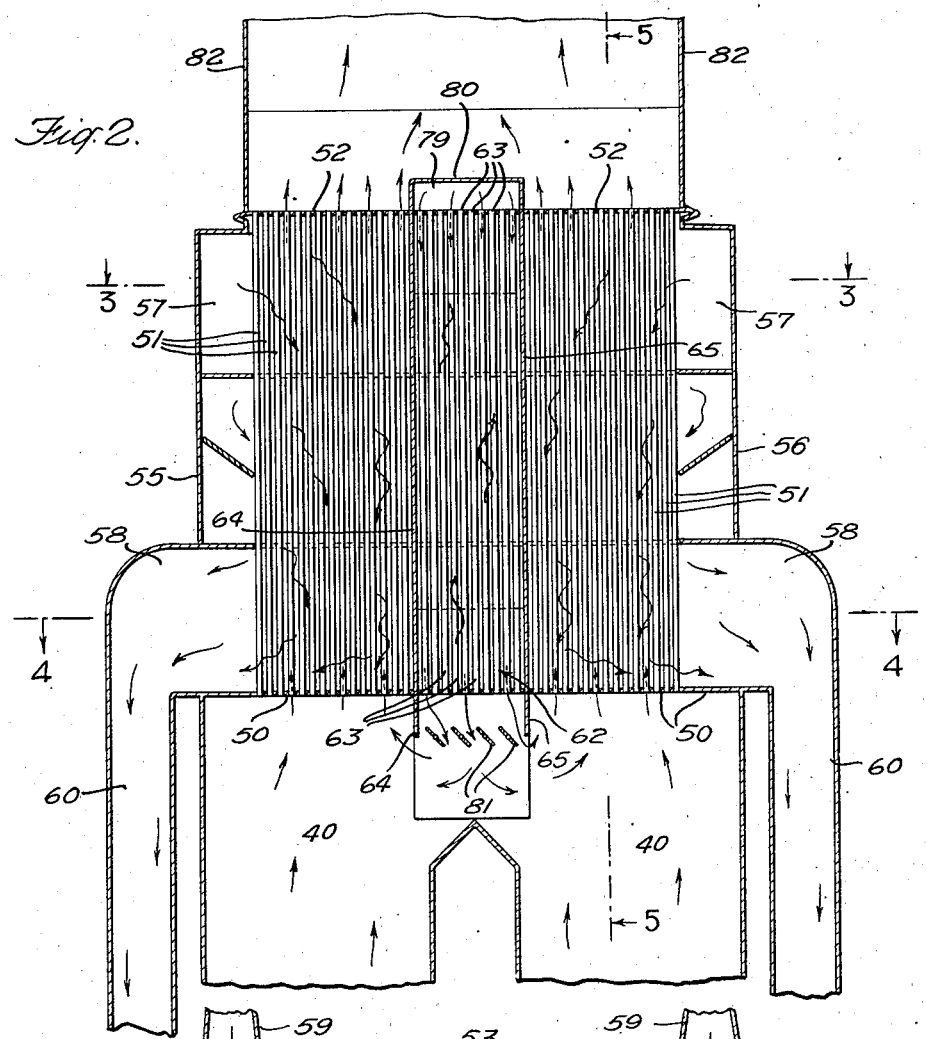
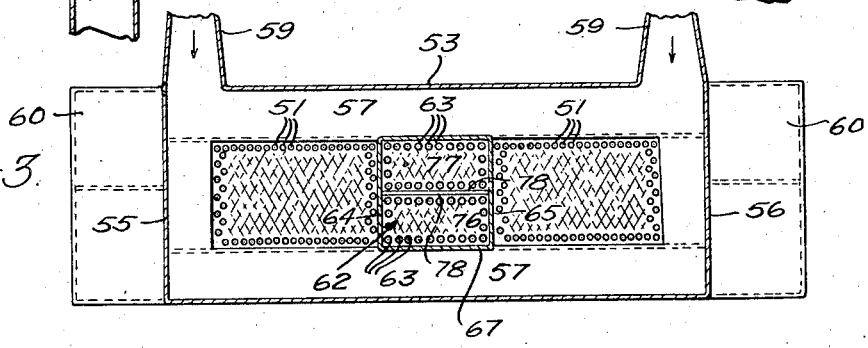
INVENTOR
NICHOLAS C. ARTSAY
BY
ATTORNEY Oct. 9, 1945.　　　　N. C. ARTSAY　　　　2,386,188
HEAT EXCHANGE APPARATUS
Filed March 4, 1942　　　4 Sheets-Sheet 3
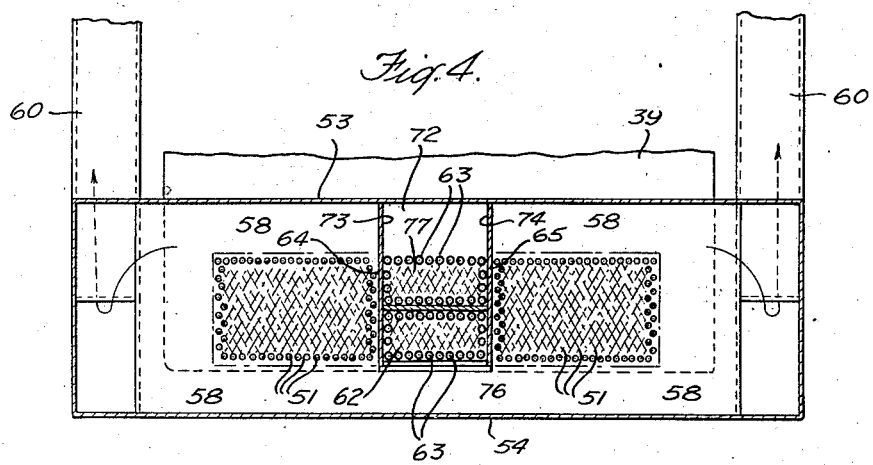
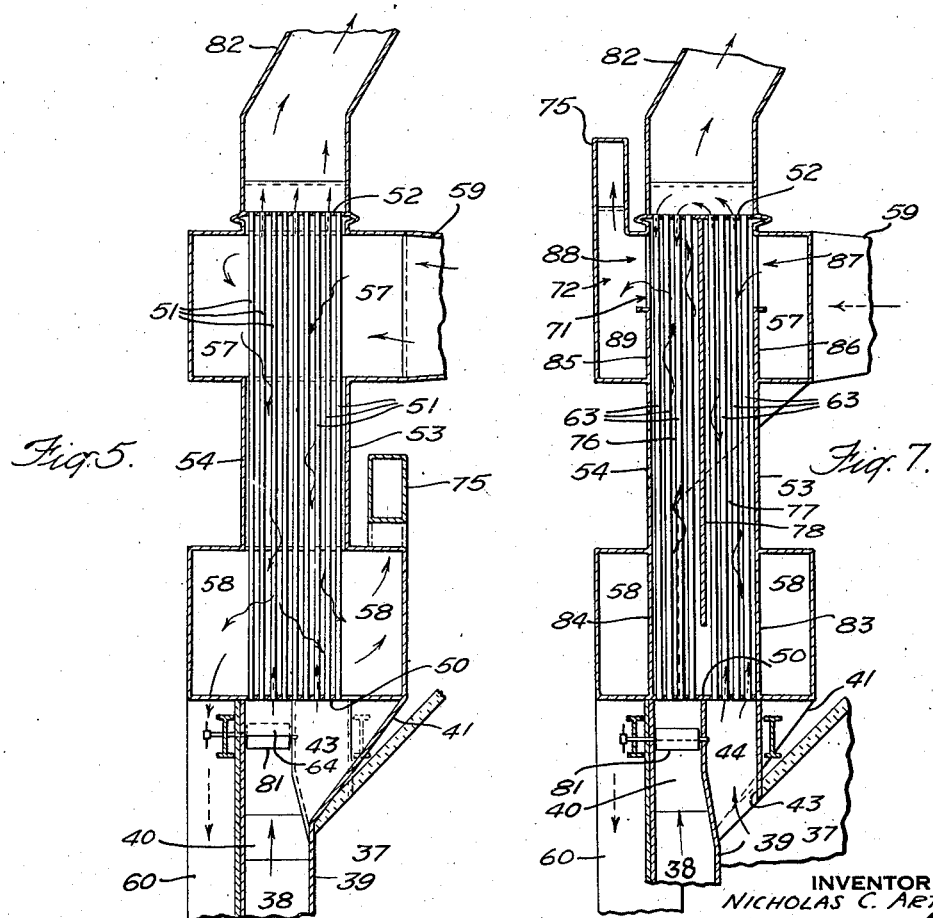
INVENTOR
NICHOLAS C. ARTSAY
BY
ATTORNEY Patented Oct. 9, 1945

2,386,188

UNITED STATES PATENT OFFICE 2,386,188

HEAT EXCHANGE APPARATUS

Nicholas C. Artsay, Valhalla, N. Y., assignor to Foster Wheeler Corporation, New York, N. Y., a corporation of New York Application March 4, 1942, Serial No. 433,263

10 Claims. (Cl. 257—220)

This invention relates to heat exchange apparatus and more particularly pertains to apparatus for heating air for use in vapor generators by heat recovered from the flue gases of said generators.

In vapor generators using pulverized fuel, it is desirable not only to heat the air used for supporting combustion in the fuel burners, commonly termed secondary air, but it is also desirable to heat the primary air which is used in drying the fuel. Generally, the degree to which the primary air must be heated to properly dry the fuel is higher than the degree to which the secondary air may be heated in recovering heat of the flue gas.

The invention when applied to the generation of steam provides a heat exchanger in which primary and secondary air used in the steam generator is heated by heat recovered from the flue gases of the generator and in which the primary air may be heated to a higher degree than the secondary air. In the apparatus of this invention, the primary air temperature is controlled to provide at all boiler loads or ratings the degree of heat required to dry the fuel, in accordance with the amount of moisture in the fuel.

The invention will be understood from the following description when considered in connection with the accompanying drawings forming a part thereof and in which:

Fig. 2 is a somewhat enlarged partial vertical sectional view taken on the line 2—2 of Fig. 1;

Fig. 3 is a horizontal sectional view taken on the line 3—3 of Fig. 2;

Fig. 4 is a horizontal sectional view taken on the line 4—4 of Fig. 2;

Fig. 5 is a vertical sectional view taken on line 5—5 of Fig. 2;

Fig. 7 is a vertical sectional view of another form of the invention.

Like characters of reference refer to like parts throughout the several views.

Figure 1:
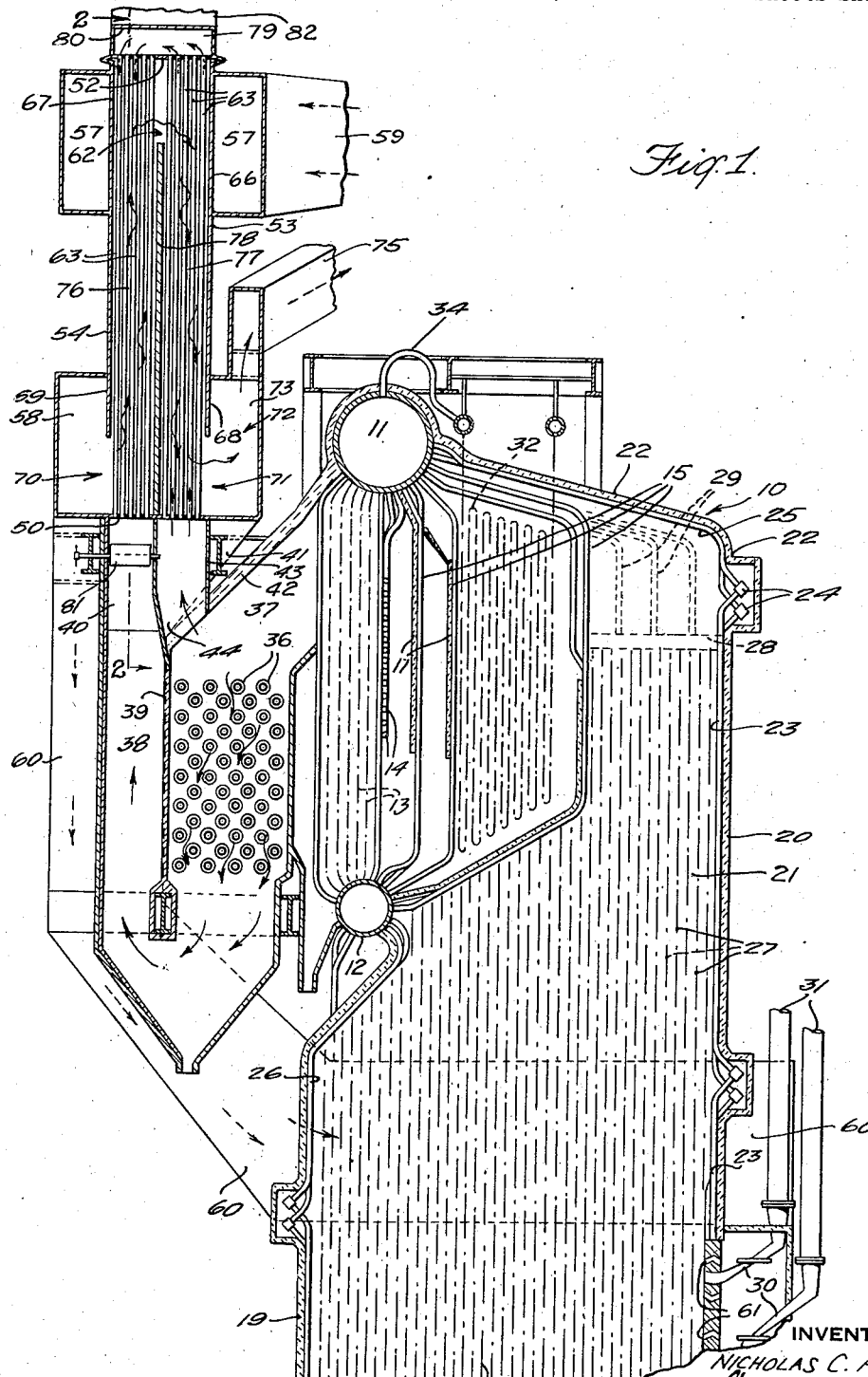
Fig. 1 is a partial vertical sectional view of one form of steam generator embodying the invention.
Figure 6:
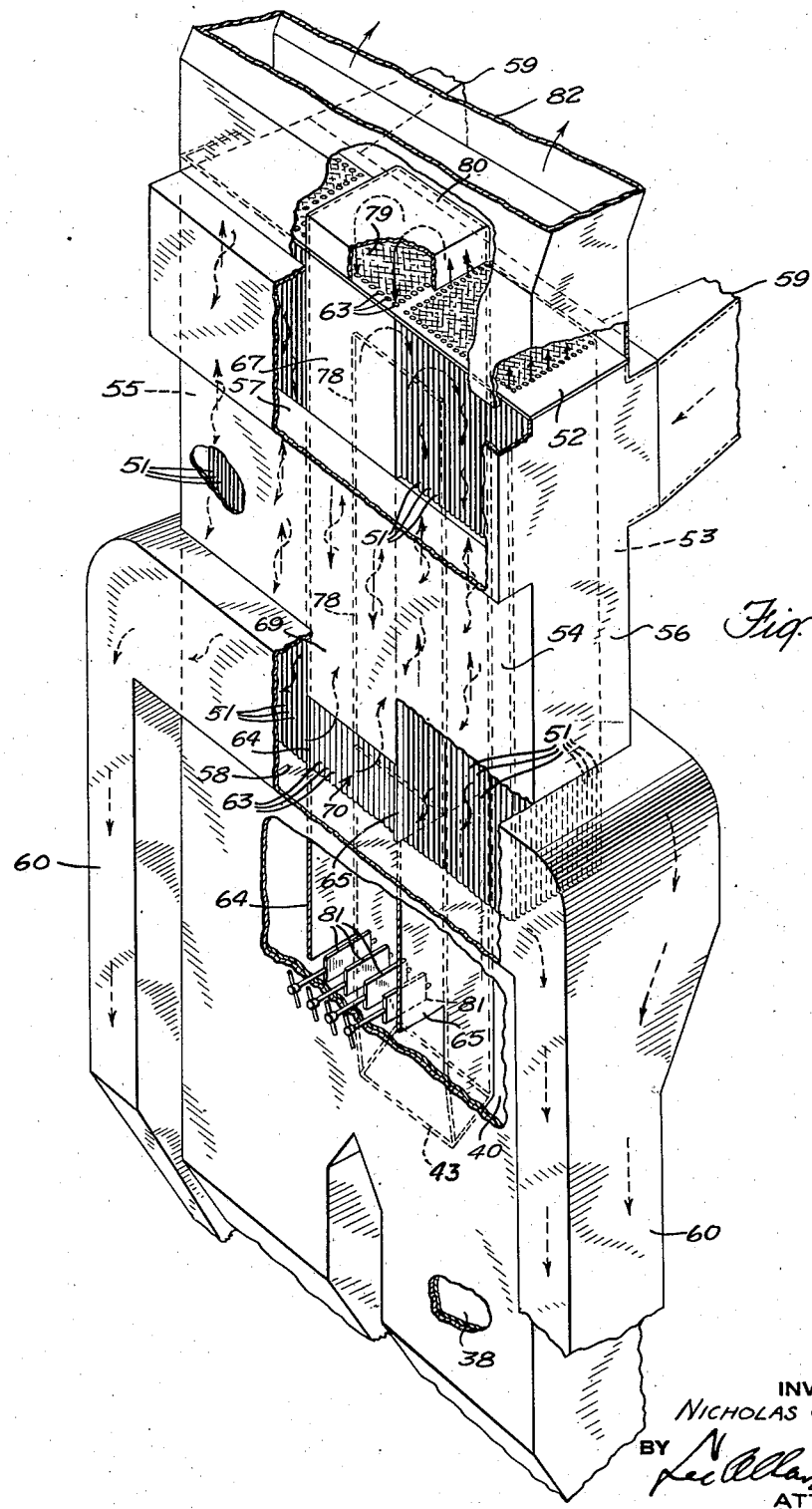
Fig. 6 is a perspective view of the form of the invention illustrated in Figs. 1-5 of the drawings.

Referring to the drawings, reference numeral 10 designates the setting of a steam generator having an upper steam and water drum 11 connected to a lower drum 12 by a vertical bank of steam generating tubes 13 and an adjacent group of horizontally extending tubes 14. Also extending between the drum 11 and the drum 12 are horizontally spaced groups of vertically extending tubes 15 having suitable flow directing baffles 17 disposed between the groups.

A furnace chamber 18 is positioned beneath the groups of tubes 13 and 14 and the groups 15, so that the gases of combustion therefrom in passing outwardly thereof will pass over the tube groups. The chamber 18 is defined by a vertical rear wall 19, a front wall 20, a side wall 21, an opposite side wall, not shown, and a roof 22 extending over the top of the chamber to the drum 11. The walls of the furnace are water cooled, the front wall 20 being lined by tubes 23 connected to the drum 11 through headers 24 and tubes 25. The rear wall 19 is lined by water wall tubes 26 connected to the drum 12 while the side wall 21 is lined by tubes 27 connected to the drum 11 through header 28 and tubes 29.

Pulverized fuel burners 30 are disposed in the front wall 20 of the furnace chamber and receive pulverized fuel through the conduits 31 from a fuel pulverizing mill, not shown. A superheater 32 is disposed between two of the groups of tubes 15 and is adapted to receive saturated steam from the drum 11 through a conduit 34.

Gases of combustion from the furnace chamber 18 flow over the several tube groups and the superheater and pass upwardly over the vertical bank of tubes 13 and then downwardly over an economizer 36 in flue passage 37, thereafter passing upwardly into an air heater through the passage 38. The passage 38 is enlarged above a partition 39 between passages 37 and 38 to form an outlet passage 40, the front wall 41 of which is inclined over the roof 42 at substantially the same angle as the roof and is formed around and separated from a duct 43 which provides a passage 44 in communication with the passage 37.

An air heater, adapted to heat primary and secondary air for the steam generator, comprises a plurality of vertically disposed and spaced tubes 51 expanded into a tube plate 50, and is positioned above the outlet passage 40. Gases leaving the tube bank 13 flow directly to the air heater through a passage 44 which has its inlet connected with the upper end of passage 37. The tubes 51 are expanded into a tube plate 52 at their upper ends, and they are enclosed in a casing comprising a front wall 53, a rear wall 54, and opposite side walls 55 and 56. The casing is enlarged at the top thereof beneath the tube plate 52 to form an air inlet chamber 57 and is also enlarged adjacent the bottom thereof to form a chamber 58. The tube plate 50 forms the bottom of the chamber 58 and covers the outlet passage 40. Gases are thereby prevented from passing into the tube casing and caused to pass upwardly through the tubes 51. Air to be heated is supplied to the chamber 57 through ducts 59 and passed downwardly over the tubes 51 to the chamber 58 and is thereby heated. A substantial portion of the heated air passes from the chamber 58 into the secondary air ducts 60 which conduct the air to hot air ports 61 adjacent burners 30 in the front wall 20 of the furnace. The remainder of the air passes from the chamber 58 into a primary air heating chamber 62 formed around the tubes 63 in the central portion of the bank of tubes 51. The tubes 63, as shown, are of larger diameter than the tubes 51 but may, if desired, be of the same size. The chamber 62 is formed by end partitions 64 and 65 which separate the chamber from the remainder of the interior of the casing, and by the front wall 53 and rear wall 54 of the casing. The end partitions extend below the tube plate 50 downwardly into the passage 40. As shown in Fig. 1, the front wall 53 has an extension 66 which projects upwardly and is fastened to the tube plate 52, and the rear wall 54 has an extension 67 likewise projecting upwardly and is fastened to the plate 52 forming respectively front and rear walls for the upper portion of the chamber 62. The front and rear walls respectively, have extensions 68 and 69 which project downwardly to a point short of the tube plate 50 thereby providing front and rear walls for the lower portion of the chamber 62 and forming an inlet opening 70 into the chamber 62 in the rear wall thereof and a discharge opening 71 in the front wall of the chamber. The inlet opening 70 is in communication with the chamber 58 while the discharge opening 71 is in communication with a primary air discharge chamber 72 formed within the chamber 58 by extensions 73 and 74 on the partitions 64 and 65 respectively which extensions extend between the top and bottom of the chamber and separate the discharge chamber 72 from the chamber 58. A primary air outlet duct 75 is connected to the chamber 72 and is adapted to conduct heated air therefrom to a pulverizer not shown.

A baffle 78 which extends vertically from the tube plate 50 to a point short of the upper tube plate 52 is positioned in the primary air heating chamber 62 between the partitions 64 and 65 substantially intermediate the front and rear walls of the casing thereby dividing the chamber 62 into an inlet passage 76 in communication with the chamber 58 through the opening 70 and a discharge passage 77 in communication with the primary air discharge chamber 72 through the opening 71. The passages 76 and 77 communicate with one another through the space above the baffle 78.

The tubes 63 in the passage 77 are in communication through the inlet ends thereof with the passage 44 in the duct 43 through which these tubes receive gases of combustion from the flue passage 37 before passage of the gases over the economizer 36. The outlet ends of the tubes are in communication with a connecting chamber 79 formed by a cap 80 above the tube plate 52. The upper ends of the tubes 63 disposed in the passage 76 communicate with the connecting chamber 79 whence they receive gases and discharge the same from their lower ends into the outlet passage 40. Discharge of the gases from the lower end of the tubes into the passage 40 is controlled by dampers 81.

Gases of combustion after passing over the economizer 36 flow upwardly in the passage 38 and enter the outlet passage 40 where they mix with gases passing through the dampers 81 from the primary air heating section. Gases from the outlet passage 40 flow upwardly in the tubes 51 and pass from the upper ends thereof into the stack 82.

In operation, gases of combustion from the furnace chamber 18 after passing over the bank of tubes 13 flow into the passage 37, flow over the economizer and through passages 38 and 40 to the air heater. Part of the gases will flow through passage 44 in conduit 43 to the air heater, the quantity depending upon the position of the dampers 81. The gases leaving outlet passage 40 flow into and through the secondary air heating tubes 51 and enter the stack 82. Gases flowing through the passage 44 in duct 43, enter the tubes 63 in the passage 77 of the primary air heating chamber 62 and pass upwardly into the connecting chamber 79. From the connecting chamber 79, the gases pass downwardly through the tubes 63 in the passage 76 and into the passage 40 becoming mixed with the gases in said passage flowing upwardly from the chamber 44. The gases flowing through the tubes 63, since they are passed directly into the tubes, are hotter than the gases flowing through the tubes 51 which gases are first passed over the economizer 36.

Air to be heated enters the chamber 57 through the ducts 59, passes downwardly through the bank of tubes 51 and enters the chamber 58. The greater part of the air thus heated, which constitutes the secondary air, flows from the chamber 58 through the ducts 60 to the hot air ports 61 in the front wall 20 of the furnace chamber. The remainder of the air from the chamber 58 passes through the inlet opening 70 into the passage 76 in the primary air heating chamber 62 and flows upwardly over the tubes 63 in the passage. From the chamber 76, the air passes over the top of the baffle 78 into the passage 77 then downwardly over the tubes 63 in the passage. The air thus heated in the primary air heating chamber 62 flows from the passage 77 through the discharge opening 71 into the primary air discharge chamber 72 thereafter entering the primary air outlet duct 75 through which it is passed to the fuel pulverizer.

The degree to which the air passing through the primary air heating chamber is heated, is regulated by the dampers 81 which control the amount of gases passed through the primary air heating tubes 63 from the duct 40 and the chamber 43. The gases from the tubes 63 in the primary air heating chamber, after passing through the dampers, enter the passage 40 where they are mixed with gases from the passage 38 thereby increasing the temperature of the gases passed from the secondary air heating tubes 51 which, particularly when the steam generator is being operated at low loads, prevents the gases in the secondary air heating section from reaching the dew point and thereby causing damage to the section by corrosion.

The operation of the form of the invention shown in Fig. 7 is substantially the same as in the form shown in Fig. 1 with the exception, however, that in the form shown in Fig. 1 the primary air is heated in the secondary heating section, whereas in the apparatus of Fig. 7 the primary air is passed directly to the primary air heating section without being preheated in the secondary air heating section. In the form of the invention shown in Fig. 7, the baffle 78 extends downwardly from the tube plate 52 to a point short of the tube plate 50. The front wall 53 and the rear wall 54 of the primary air heating casing has extensions 83 and 84 respectively at the bottom thereof which extend downwardly to the tube plate 50. These walls each have extensions 85 and 86 respectively which extend upwardly to a point short of the tube plate 52 thereby forming an intake opening 87 and a discharge opening 88 in the primary air heating chamber. A primary air discharge chamber 89 separated from the chamber 57 by an extension on end partitions 64 and 65 is in communication with the discharge opening 88 and the primary air outlet duct 75. Air to be heated passes from the duct 59 into the chamber 57 whence a portion of it passes directly into the passage 77 of the primary air heating chamber through the opening 87 downwardly through the passage 77 around the end of the baffle, upwardly in the passage 76, through the discharge opening 88 into the chamber 89 and thence into the conduit 75. The remainder of the air passes from the chamber 57 downwardly over the tubes 51 and into the chamber 58 whence it enters the conduits 60.

Although the invention has been disclosed as embodied in a steam generator adapted for the combustion of low volatile fuels in which an air heater is employed to preheat primary air and secondary air, the invention is applicable to any form of vapor generator in which an economizer or other heat recovery device and an air heater are employed to recover heat from the flue gases. It is understood that changes may be made in the location and relative arrangement of the parts of the apparatus shown and described herein, without departing from the principles of the invention, which is not to be limited excepting by the scope of the appended claims.

What is claimed is:

1. Heat exchange apparatus for extracting heat from gases comprising a heat absorbing device positioned in the path of flow of a portion only of said gases, air heating apparatus comprising a first air heater and a second air heater through each of which air and gases flow in indirect heat exchange relationship, means for introducing air into said air heaters, each air heater having a gas inlet and a gas outlet, the first air heater having its gas inlet in communication with the path of flow of the gases at a point therein in advance of said heat absorbing device, means through which gases from the outlet of the first air heater flow to the second air heater, the second air heater having its gas inlet in communication with said path at a point therein beyond said heat absorbing device, means through which gases pass from the second air heater, and means through which heated air is conducted from the air heaters.

2. Heat exchange apparatus for extracting heat from gases comprising a heat absorbing device positioned in the path of flow of a portion only of said gases, air heating apparatus comprising a first air heater and a second air heater, a plurality of spaced tubes in each heater, the tubes of the second air heater being in communication with the path of flow of the gases at a point beyond the heat absorbing device in respect to the direction of flow of gases, some of the tubes of the first air heater being in communication with other of the tubes thereof at one end of said heater, conduit means in communication with the opposite end of said some of the tubes of the first air heater and the path of flow of the gases, said means being in communication with the path of flow of the gases at a point in advance of the heat absorbing device in respect to the direction of flow of the gases, means through which the gases from the opposite end of said other of the tubes of the first air heater flow to the tubes of the second air heater, means for introducing air into said air heater to pass in heat exchange relationship with the tubes, means through which gases pass from the second air heater, and means through which heated air is conducted from the air heaters.

3. Heat exchange apparatus for extracting heat from gases comprising a heat absorbing device positioned in the path of flow of a portion only of said gases, air heating apparatus comprising a first air heater and a second air heater, a plurality of spaced tubes in each heater, the tubes of the second air heater being in communication with the path of flow of the gases at a point beyond the heat absorbing device in respect to the direction of flow of gases, some of the tubes of the first air heater being in communication with other of the tubes thereof at one end of said heater, conduit means in communication with the opposite end of said some of the tubes of the first air heater and the path of flow of the gases, said means being in communication with the path of flow of the gases at a point in advance of the heat absorbing device in respect to the direction of flow of the gases, means through which gases from the opposite end of said other of the tubes of the first air heater flow to the tubes of the second air heater, means for introducing air into the second air heater to pass in heat exchange relationship with the tubes therein, the second air heater being connected with the first air heater so that a portion of the air pre-heated in the second heater flows into the first heater, means through which gases pass from the second air heater, and means through which heated air is conducted from the air heaters.

4. Heat exchange apparatus for extracting heat from gases comprising a heat absorbing device positioned in the path of flow of a portion only of said gases, air heating apparatus comprising a substantially centrally disposed air heating section, other air heating sections at opposite sides of said centrally disposed section and separated therefrom, the air heating sections being laterally arranged at substantially the same elevation, a plurality of spaced tubes in said sections, the tubes of said other air heating sections being in communication with the path of flow of the gases at a point beyond the heat absorbing device in respect to the direction of flow of gases, the tubes of the centrally disposed air heating section being in communication with each other at one end, conduit means in communication with the opposite end of some of the tubes of the centrally disposed air heating section and the path of flow of the gases, said means being in communication with the path of flow of the gases at a point in advance of the heat absorbing device in respect to the direction of flow of the gases, means through which gases from the opposite end of other of the tubes of the centrally disposed air heating section flow to the tubes of said other air heating sections, means for introducing air into the air heating sections to pass in heat exchange relationship with the tubes, means through which the gases pass from the other air heating sections, and means through which heated air is conducted from the air heaters.

5. Heat exchange apparatus for extracting heat from gases comprising a heat absorbing device positioned in the path of flow of a portion only of said gases, air heating apparatus comprising a substantially centrally disposed air heating section, other air heating sections at opposite sides of said centrally disposed section and separated therefrom, the air heating sections being laterally arranged at substantially the same elevation, a plurality of spaced tubes in said sections, the tubes of said other air heating sections being in communication with the path of flow of the gases at a point beyond the heat absorbing device in respect to the direction of flow of gases, the tubes of the centrally disposed air heating section being in communication with each other at one end, conduit means in communication with the opposite end of some of the tubes of the centrally disposed air heating section and the path of flow of the gases, said means being in communication with the path of flow of the gases at a point in advance of the heat absorbing device in respect to the direction of flow of the gases, means through which gases from the opposite end of other of the tubes of the centrally disposed air heating section flow to the tubes of said other air heating sections, means for introducing air into said other air heating sections, the other air heaters being connected with the centrally disposed heater so that a portion of the air preheated in the other air heating sections flows into said centrally disposed heater, means through which the gases pass from the other air heating sections, and means through which heated air is conducted from the air heaters.

6. Air heating apparatus through which gases flow in heat exchange relationship with air, said apparatus having a substantially centrally disposed air heating section, other air heating sections at opposite sides of said centrally disposed section and separated therefrom, the air heating sections being laterally arranged at substantially the same elevation, means for introducing air into said air heating sections, conduits for conducting gases to each air heater, the conduit for the centrally disposed section being constructed and arranged to conduct gases to a part only of one end of said central section, means at the other end of the central section to cause gases discharged from said part to flow into and through another part of the central section in a direction opposite to the flow through said part, means to conduct gases discharged from said other part of the central section to the inlet ends of said other air heating sections for flow therethrough, means for controlling the flow of gases through the centrally disposed section, means through which gases flow from said other sections, and means through which heated air is conducted from the centrally disposed section and said other sections.

7. Air heating apparatus through which gases flow in heat exchange relationship with air, said apparatus having a substantially centrally disposed air heating section, other air heating sections at opposite sides of said centrally disposed section and separated therefrom, the air heating sections being laterally arranged at substantially the same elevation, means for introducing air to be heated into said other heating sections, the centrally disposed heating section being in communication with said other sections to receive pre-heated air therefrom, conduits for conducting gases to each air heater, the conduit for the centrally disposed section being constructed and arranged to conduct gases to a part only of one end of said central section, means at the other end of the central section to cause gases discharged from said part to flow into and through another part of the central section in a direction opposite to the flow through said part, means to conduct gases discharged from said other part of the central section to the inlet ends of said other air heating sections for flow therethrough, means for controlling the flow of gases through the centrally disposed section, means through which gases flow from said other sections, and means through which heated air is conducted from the centrally disposed section and said other sections.

8. Air heating apparatus having a substantially centrally disposed air heating section, other air heating sections at opposite sides of the centrally disposed section and separated therefrom, the other air heating sections being laterally arranged at substantially the same elevation, a plurality of spaced tubes in said sections, conduits for conducting gases to the tubes of each air heater, the conduit for the centrally disposed section being constructed and arranged to conduct gases to one end of some only of the tubes of said central section, means at the other end of the tubes of the central section to cause gases discharged from said some tubes to flow into and through others of the tubes of the central section in a direction opposite to the flow through said some tubes, means to conduct gases discharged from said other tubes of the central section to the inlet ends of said other air heating sections for flow therethrough, means for introducing air into the heating sections to pass in heat exchange relationship with the tubes, control means for controlling the flow of gases through the centrally disposed section, means through which gases pass from said other sections, and means through which heated air is conducted from the air heaters.

9. Heat exchange apparatus for recovering waste heat from gases comprising an air heating device having a plurality of air heaters through each of which air and gases flow in indirect heat exchange relationship, each air heater having separate air and gas inlets and separate air and gas outlets, a heat absorbing device, means for conducting waste gases to the heat absorbing device for flow thereover, means for conducting gases discharged from said device to at least one but not all of the air heaters, a by-pass conduit in communication with the means conducting waste gases to the heat absorbing device for conducting some of the waste gases to another air heater without flowing over the heat absorbing device, and means for conducting gases discharged from said other air heater to the inlet ends of said at least one air heater, the construction and arrangement being such that gases entering the air heaters are at different temperatures and the air flowing through said heaters is heated to different temperatures, and gases from the gas outlet of the heater in which air is heated to a higher temperature mixes with the gases which flow through another heater in which the air is heated to a lower temperature.

10. Heat exchange apparatus for recovering waste heat from gases comprising an air heating device having a plurality of air heaters through each of which air and gases flow in indirect heat exchange relationship, each air heater having separate air and gas inlets and separate air and gas outlets, a heat absorbing device, means for conducting waste gases to the heat absorbing device for flow thereover, means for conducting gases discharged from said device to at least one but not all of the air heaters, a by-pass conduit in communication with the means conducting waste gases to the heat absorbing device for conducting some of the waste gases to another air heater without flowing over the heat absorbing device, means for conducting gases discharged from said other air heater to the inlet ends of said at least one air heater, the construction and arrangement being such that gases entering the air heaters are at different temperatures and the air flowing through said heaters is heated to different temperatures, and gases from the gas outlet of the heater in which air is heated to a higher temperature mixes with the gases which flow through another heater in which the air is heated to a lower temperature, and control means for controlling the flow of gases through the heater in which air is heated to the higher temperature.

NICHOLAS C. ARTSAY.